3,271,454
PRODUCTION OF UNSYMMETRICAL DIALKYLHYDRAZINES

Donald Pickens, Hopewell, Va., assignor to Allied Chemical Corporation, a corporation of New York
No Drawing. Filed Feb. 20, 1957, Ser. No. 641,237
2 Claims. (Cl. 260—583)

This invention relates to the production of unsymmetrical-dialkylhydrazines in which the alkyl groups each contain from 1 to 3 carbon atoms and specifically to the production of unsymmetrical-dimethylhydrazines, herein referred to for the sake of brevity as DMH. More particularly this invention relates to the catalytic hydrogenation of nitrosodimethylamine to produce DMH. While the invention will be hereinafter described, for the most part, in connection with the production of the preferred embodiment, DMH, it will be understood it is not limited thereto and includes the preparation of unsymmetrical-dialkylhydrazines such as diethyl-, dipropyl-, unsymmetrical-methylethyl-, and unsymmetrical-ethylpropyl-hydrazines.

In the production of DMH for use as a special fuel in the guided missile and rocket fields, it has been proposed to prepare it by nitrosation of dimethylamine hydrochloride followed by chemical reduction of the nitrosodimethylamine employing nascent hydrogen liberated by the reaction of zinc with acetic acid. Such procedures invariably result in poor yields of DMH and are otherwise objectionable.

It is among the objects of the present invention to provide a process of hydrogenating nitrosodialkylamines having from 1 to 3 carbon atoms in the alkyl groups, such for example as nitrosodimethylamine, which process results in high yields of dialkylhydrazines (DMH in the case of the hydrogenation of nitrosodimethylamine).

Other objects and advantages of this invention will be apparent from the following detailed description thereof.

In accordance with the present invention, nitrosodialkylamines, preferably nitrosodimethylamine, is hydrogenated at superatmospheric pressures and at temperatures within the range of 0° to 60° C. employing a finely divided platinum or palladium catalyst, supported or unsupported, in a concentration of from 2 to 22 grams of catalyst per mol of nitrosodimethylamine or other nitrosodialkylamine.

Preferably the hydrogenation is carried out employing a solution of nitrosodimethylamine in water as the solvent having a nitrosodimethylamine concentration of 20% to 35% by weight in the presence of a catalyst consisting of platinum on an aluminum support in a concentration of from 7 to 15 grams of catalyst per mol of nitrosodimethylamine at an initial hydrogen pressure of from 800 to 2000 pounds per square inch and at a temperature of from 20 to 45° C. By following these conditions a surprising improvement in the yield of DMH is obtained. Thus high yields are obtained operating within the above noted broader ranges of conditions in a hydrogenation time of 1 to 8 hours. Hydrogenations carried out in accordance with the preferred conditions give high yields in hydrogenation times of 1 to 3 hours.

The nitrosodimethylamine subjected to hydrogenation may be obtained from any suitable source. For example, it can be made by reacting dimethylamine hydrochloride with sodium nitrite or with a mixture of nitrosyl chloride and sodium hydroxide and recovering the nitrosodimethylamine from the reaction mixture by distillation. The crude aqueous nitrosodimethylamine may be hydrogenated in accordance with this invention, or it may be subjected to preliminary purification treatments such as solvent extraction or other suitable purification treatments to produce a pure nitrosodimethylamine which is subjected to hydrogenation.

Aqueous nitrosodimethylamine as prepared by nitrosation of dimethylamine, invariably contains a small amount of nitrogen oxides. These need not be removed before subjecting the nitrosodimethylamine to hydrogenation as they do not appreciably affect the yield of DMH. However, if maximum space-time yields are desired, they can be removed, for example by neutralization with sodium hydroxide prior to distillation from the reaction mixture or by stripping with air. Removal of the nitrogen oxides effects a reduction in the hydrogenation time.

As the catalyst finely divided platinum or palladium, supported or unsupported, may be used. The preferred catalysts are platinum or palladium supported catalysts containing 2 to 15% by weight of platinum or palladium. While an alumina support is preferred, other supports such as carbon, kieselguhr, pumice, silica, zinc oxide and molybdenum oxide may be used. Such catalysts can be produced in any well known manner, for example, by depositing a platinum salt, e.g., platinic chloride on alumina particles, treating with sodium hydroxide, and reducing the platinum oxide to form a platinum deposit on the alumina. Alternatively, platinum or palladium may be directly deposited on the support particles.

The catalyst is mixed with the nitrosodimethylamine in the liquid phase to form a slurry or suspension having a concentration of from 2 to 22, preferably 7 to 15, grams of catalyst per mol of nitrosodimethylamine. In the case of a supported catalyst, the weight given includes the weight of the support. This slurry may contain as the liquid phase nitrosodimethylamine with or without a solvent. However, it is preferred to use a solution containing from 20 to 35 weight percent of nitrosodimethylamine. Water is the preferred solvent although other solvents such as aqueous acetic acid, ethanol, ethylene glycol and mixtures of these solvents, with or without additional water, may be used.

The hydrogenation may be carried out continuously by continuously introducing a slurry of nitrosodimethylamine and catalyst and hydrogen under pressure into a reactor designed to give the proper residence time of the nitrosodimethylamine catalyst slurry and the hydrogen and withdrawing the reaction products from the exit of this reactor. Alternatively, the reaction may be carried out batchwise by introducing the catalyst slurry or suspension in nitrosodimethylamine, having the catalyst concentration above noted, into an autoclave and introducing the hydrogen under pressure. The amount of hydrogen thus introduced is in excess of the stoichiometric amount required for the reduction. The amount of excess is not critical. It is important that the initial hydrogen pressure be at least 50 pounds per square inch preferably at least 800 pounds per square inch. Towards the end of the reaction the pressure may be allowed to drop without deleterious results. Optimum yields are obtained when the initial pressure is from about 1500 to 2000 pounds per square inch and the final pressure is about 500 pounds per square inch, the pressure being allowed to decrease as the hydrogenation reaction proceeds until the reaction is completed. Desirably the pressure is allowed to drop after the reaction has progressed to the point where approximately 50% of the nitrosodimethylamine has been converted to DMH.

When the activity of the catalyst decreases to the point where satisfactory yields are no longer obtained, it can readily be regenerated by heating at 100° to 200° C. for 15 to 60 minutes. Longer heating periods may of course be used but generally are not necessary to effect restoration of the activity of the catalyst. If temperatures of the order of 100° C. are used the catalyst should be heated for a longer period within the range above noted.

Conversely by heating to a higher temperature a shorter heating period may be used. In the continuous process, catalyst separated from the reaction mixture is preferably regenerated and returned to the process. In batch operation, the catalyst may be reused once or twice before regeneration.

The hydrogenation time is dependent on the concentration of nitrosodimethylamine, catalyst concentration, temperature, pressure, and presence of nitrogen oxides in the nitrosodimethylamine subjected to hydrogenation. Higher yields, e.g. about 85% or higher are obtained when employing hydrogenation periods of 1 to 3 hours using preferred conditions, namely: an aqueous solution of nitrosodimethylamine having a concentration of from 20% to 35% by weight, in the presence of 7 to 15 grams of platinum or palladium catalyst per mol of nitrosodimethylamine at an initial hydrogen pressure of 800 to 2000 pounds per square inch and a temperature of 20 to 45° C. As noted, carrying out the hydrogenation in accordance with the border range of conditions of the present invention may involve a hydrogenation time of from 1 to 8 hours to obtain good yields.

Substantially pure DMH is recovered from the reaction mixture by distillation through a packed column. Alternatively the DMH may be separate from the aqueous reaction mixture by formation of the acid salt, e.g. dimethylhydrazine hydrochloride, removal of water under reduced pressure, addition of an excess (over and above the amount required to react with the acid of the hydrochloride) of base, such as sodium or potassium hydroxide, and distillation of the DMH liberated.

The following examples are given for purposes of illustrating the invention. It will be understood the invention is not limited to these examples. These examples were carried out by introducing the nitrosodimethylamine, diluted to the concentration indicated, into a stainless steel rocking type autoclave and then introducing the hydrogen for the period indicated. The crude product at the end of each run or example was filtered and analyzed. Pure DMH was recovered by distillation through a packed column.

In the headings of the tables given below, Wt. % means weight percent of nitrosodimethylamine in water; IP means initial pressure in pounds per square inch gauge; Mols $H_2$ means the number of mols of hydrogen absorbed per mol of nitrosodimethylamine; HT means hydrogenation temperature in ° C.; H time means hydrogenation time in hours and C Con. means catalyst concentration in grams per mol of nitrosodimethylamine.

The series of examples given in Table I which follows, involved the use of a platinum catalyst of 200 mesh containing 5% by weight of platinum on a alumina support. The catalyst was employed in the examples of Table I in a concentration of 15 grams per mol of nitrosodimethylamine; i.e., 5 grams of catalyst were used per 24.7 grams of nitrosodimethylamine.

TABLE I

| Example Number | Weight Percent | IP | Mols, $H_2$ | HT Initial | HT Max. | HT Final | H Time | Percent Yield, DMH |
|---|---|---|---|---|---|---|---|---|
| 1 | 16.5 | 1,600 | 2.05 | 27 | 37 | 36 | 1.42 | 87.7 |
| 2 | 23.6 | 1,600 | 1.97 | 23 | 31 | 31 | 1.48 | 86.2 |
| 3 | 29.2 | 1,600 | 2.09 | 27 | 35 | 35 | 1.42 | 81.9 |
| 4 | 33.0 | 1,600 | 1.96 | 26 | 36 | 34 | 1.50 | 85.4 |
| 5 | 33.0 | 1,750 | 1.96 | 27 | 34 | 33 | 1.50 | 83.5 |
| 6 | 40.0 | 1,800 | 2.00 | 26.5 | 33 | 32.5 | 2.00 | 70.8 |
| 7 | 49.5 | 1,600 | 1.97 | 25 | 30 | 29 | 4.58 | 76.1 |

The series of examples given in Table II which follows involved the same type of catalyst as in Examples 1 to 7 inclusive, but employed varying concentrations thereof in the nitrosodimethylamine as indicated in Table II. The weight percentum of nitrosodimethylamine in water as the solvent in all examples of Table II was 16.5%.

TABLE II

| Example Number | C. Con. | IP | Mols, $H_2$ | HT Initial | HT Max. | HT Final | H Time | Percent Yield, DMH |
|---|---|---|---|---|---|---|---|---|
| 8 | 6.0 | 2,025 | 2.05 | 25 | 31 | 28 | 3.90 | 91.6 |
| 9 | 10.5 | 1,950 | 2.06 | 24 | 32 | 32 | 1.57 | 91.6 |
| 10 | 12.0 | 1,975 | 2.07 | 25 | 32 | 32 | 1.23 | 91.8 |
| 11 | 15.0 | 1,800 | 1.95 | 25 | 36 | 31 | 1.88 | 93.0 |
| 12 | 15.0 | 1,600 | 2.05 | 27 | 37 | 36 | 1.42 | 87.7 |
| 13 | 21.0 | 1,900 | 2.07 | 25 | 36 | 35 | 0.92 | 88.5 |

The series of examples in Table III which follows involved the use of the same type of catalyst as in Examples 1 to 7, inclusive, in a concentration of 15 grams per mol of nitrosodimethylamine, and employing an aqueous solution of nitrosodimethylamine containing 16.5 weight percent nitrosodimethylamine. The six examples of this series involved the use of markedly different temperatures within the range of 0 to 60° C.

TABLE III

| Ex. No. | IP | Mols, $H_2$ | HT Initial | HT Max. | HT Final | H Time | Percent Yield, DMH |
|---|---|---|---|---|---|---|---|
| 14 | 1,550 | 2.04 | 1 | 22 | 22 | 2.19 | 89.8 |
| 15 | 1,750 | 2.04 | 15 | 32.5 | 32 | 1.00 | 90.4 |
| 16 | 1,600 | 2.05 | 27 | 37 | 36 | 1.42 | 87.7 |
| 17 | 1,975 | 2.05 | 40 | 47 | 43 | 0.84 | 83.3 |
| 18 | 1,815 | 1.95 | 50 | 58.5 | 52 | 0.88 | 73.5 |
| 19 | 1,775 | 2.05 | 60 | 60 | 49 | 2.33 | 67.5 |

The series of examples in Table IV which follows differs from those of Table III chiefly in that the pressure at which the hydrogenation was carried out was varied as indicated in Table IV; otherwise except for the conditions indicated in the data given in Table IV the conditions were substantially the same as in the examples given in Table III. Example 20 was carried out in a low pressure hydrogenator instead of the rocking type autoclave employed in the remaining examples. The pressure ranges given are in pounds per square inch guage.

TABLE IV

| Example Number | Pressure Range | Mols, H₂ | HT Initial | HT Max. | HT Final | H Time | Percent Yield, DMH |
|---|---|---|---|---|---|---|---|
| 20 | 55.5-25 | 2.00 | 27 | 34.5 | 28.5 | 6.33 | 63.2 |
| 21 | 800-300 | 2.06 | 24.5 | 30 | 30 | 5.95 | 79.5 |
| 22 | 1,500-1,000 | 2.02 | 24 | 43 | 38 | 1.92 | 81.6 |
| 23 | 2,000-1,500 | 2.02 | 26 | 34.5 | 33 | 1.83 | 79.9 |
| 24 | 1,900-450 | 2.01 | 26 | 36 | 35 | 1.00 | 89.8 |
| 25 | 1,875-425 | 2.02 | 25 | 36 | 35 | 1.00 | 90.2 |

The series of examples in Table V which follows involved the use of a palladium catalyst supported on alumina (5% palladium based on the weight of the alumina support) in a concentration of 15 grams per mol of nitrosodimethylamine and using the different solvents indicated in the table for the nitrosodimethylamine.

TABLE V

| Example Number | Solvent | IP | Mols, H₂ | HT Initial | HT Max. | HT Final | H Time | Percent Yield, DMH |
|---|---|---|---|---|---|---|---|---|
| 26 | 3.4% CH₃COOH in H₂O | 1,625 | 1.90 | 28 | 39 | 39 | 1.23 | 70.4 |
| 27 | 4.1% CH₃COOH in H₂O | 1,575 | 1.8 | 30 | 36 | 36 | 1.92 | 74.3 |
| 28 | 95% EtOH | 1,550 | 1.8 | 29 | 50 | 46 | 5.92 | 83.7 |
| 29 | 3% CH₃COOH in H₂O | 1,525 | 1.93 | 29 | 57 | 45 | 3.28 | 55.2 |
| 30 | 3% CH₃COOH in H₂O | 1,875 | 1.72 | 30 | 64 | 62 | 1.33 | 57.9 |
| 31 | 3% CH₃COOH in H₂O | 1,925 | 1.87 | 26.5 | 34 | 34 | 1.83 | 59.6 |
| 32 | 1 drop CH₃COOH in C₂H₄(OH)₂ | 1,850 | 1.90 | 27 | 57 | 48 | 3.92 | 78.2 |

The weight percentum of nitrosodimethylamine in solution in the examples of Table V was as follows:

Percent
Examples 26 and 28 _____ 16.5
Example 27 _____ 19.2
Examples 29, 30 and 31 _____ 14.6
Example 32 _____ 16

The series of examples in Table VI which follows involved the use of the same type of catalyst as employed in Examples 1 to 7, inclusive, at a concentration of 15 grams per mol of nitrosodimethylamine. In Examples 33, 34 and 35, the nitrosodimethylamine was made slightly basic with sodium hydroxide before being subjected to hydrogenation. In Example 36 a large excess of sodium hydroxide was used to treat the nitrosodimethylamine before subjecting it to hydrogenation. In Example 37 air was passed through the nitrosodimethylamine to remove nitrogen oxides before the hydrogenation treatment. In Examples 38 and 39 the nitrosodimethylamine reaction mix was hydrogenated without subjecting it to a preliminary treatment to effect removal of nitrogen oxides.

TABLE VI

| Example Number | Weight Percent | IP | Mols, H₂ | HT Initial | HT Max. | HT Final | H Time | Percent Yield, DMH |
|---|---|---|---|---|---|---|---|---|
| 33 | 41.08 | 1,425 | 1.97 | 28 | 50 | 49 | 1.20 | 80.9 |
| 34 | 39.8 | 1,550 | 1.90 | 25 | 48 | 48 | 1.55 | 84.9 |
| 35 | 25.40 | 1,500 | 1.98 | 29 | 50 | 50 | 0.78 | 93.4 |
| 36 | 34.8 | 1,490 | 1.93 | 32 | 56 | 54 | 1.17 | 71.0 |
| 37 | 33.3 | 1,350 | 1.86 | 27 | 47 | 46 | 1.78 | 80.6 |
| 38 | 37.2 | 1,400 | 1.91 | 27 | 51 | 51 | 1.60 | 60.1 |
| 39 | 36.2 | 1,250 | 1.95 | 28 | 47 | 46 | 1.80 | 80.5 |

The series of examples in Table VII which follows involved a platinum on alumina support catalyst having 5 weight percent of platinum in a concentration of 15 grams per mol of nitrosodimethylamine and the use of an aqueous solution of nitrosodimethylamine containing 16.5 weight percent nitrosodimethylamine. Example 40 involved a fresh catalyst; Example 41 the catalyst used in Example 40 after regeneration by heating at 104° C. for 1 hour and Example 42 the catalyst use in Example 41 after heating at 200° C. for 15 minutes.

TABLE VII

| Ex. No. | IP | Mols, H₂ | HT Initial | HT Max. | HT Final | H Time | Percent Yield, DMH |
|---|---|---|---|---|---|---|---|
| 40 | 1,875 | 2.02 | 25 | 36 | 35 | 1.00 | 90.2 |
| 41 | 1,850 | 2.01 | 27 | 35 | 34 | 1.48 | 87.2 |
| 42 | 1,790 | 1.94 | 26 | 35 | 31 | 2.33 | 91.6 |

*Example 43*

This example involves the use of an unsupported catalyst. 42 grams of water were added to an equal amount of dimethylamine hydrochloride in a flask, equipped with stirrer, thermometer, dropping funnel and reflux condenser. A slurry of 44.4 grams of sodium nitrite in 35 ml. of water was added slowly while stirring and the reaction mixture was held at 70-75° C. for 1.5 hours. The mixture was then distilled at reduced pressure to produce an aqueous solution of nitrosodimethylamine. This solution was diluted with water to 150 ml. and charged to a rocking autoclave. One gram of platinum black was added as catalyst. Hydrogen was admitted to the autoclave at an initial pressure of 1340 p.s.i.g. at 25° C. After 24 hours the pressure had dropped to 1050 p.s.i.g. The autoclave was then opened and the DMH recovered.

The nitrosation of the dimethylamine can be carried out in wooden, tile or lead lined vessels. The hydrogenation may be carried out in stainless steel autoclaves. The DMH may be stored in aluminum, mild steel or glass containers. It will, of course, be appreciated that any desired materials of construction resistant to corrosion by the reactants and reaction products may be employed.

It will be noted the present invention provides a process of hydrogenating nitrosodialkylamines particularly nitrosodimethylamine which results in high yields of the desired dialkylhydrazines.

It is to be understood that this invention is not restricted to the present disclosure otherwise than as defined by the appended claims.

What is claimed is:

1. The process of hydrogenating nitrosodimethylamine to produce unsymmetrical-dimethylhydrazine which comprises producing a slurry of a platinum catalyst on an alumina support in an aqueous solution of nitrosodimethylamine, said solution having a concentration of 20 to 35 weight percent nitrosodimethylamine and said slurry containing from 7 to 15 grams of catalyst per mol of nitrosodimethylamine, introducing hydrogen at an initial pressure of 800 to 2000 pounds per square inch gauge into said slurry, maintaining the temperature during the introduction of said hydrogen within the range of 20° to 45° C. and continuing the introduction of the hydrogen until substantially all of the nitrosodimethylamine has been converted to unsymmetrical-dimethylhydrazine.

2. The hydrogenation process defined in claim 1 in which the hydrogen is introduced at an initial pressure of about 2000 pounds per square inch gauge and after at least about 50% of the nitrosodimethylamine has been converted to unsymmetrical-dimethylhydrazine introducing the hydrogen at a pressure not exceeding about 500 pounds per square inch gauge.

References Cited by the Examiner

UNITED STATES PATENTS

| | | | |
|---|---|---|---|
| 2,549,683 | 4/1951 | Heinzelmann | 260—570.5 |
| 2,768,878 | 10/1956 | Passino | 260—583 |
| 2,802,031 | 8/1957 | Horvitz | 260—583 |
| 3,182,086 | 5/1965 | Levering et al. | 260—583 |
| 3,187,051 | 6/1965 | Mock | 260—583 |

FOREIGN PATENTS

| | | |
|---|---|---|
| 648,904 | 1/1951 | Great Britain. |
| 797,483 | 7/1958 | Great Britain. |

OTHER REFERENCES

Blatt, Organic Synthesis, Collective volume II, 1943, pages 211–213.

Ellis, Hydrogenation of Organic Substances, 3rd edition, 1930, p. 87.

Fieser et al., Advanced Organic Chemistry, 1961, page 281.

Fisher, Chem. Berichte, vol. 8, 1875, pages 1587–90.

Gilman, Organic Chemistry, vol. 1, 2nd edition, 1943, pages 780, 781, 786 and 787.

Grillot, J.A.C.S., vol. 66, 1944, page 2124.

Groggins, Unit Processes in Organic Synthesis, 4th edition, 1952, pages 519 and 520.

Haworth et al., Jour. Chem. Soc. (London), (1951), p. 2070.

Paal et al., Chem. Berichte, vol. 63B, 1930, pages 57–66.

Wieland, "Die Hydrazine," Verlag von Ferdinand Enke, Stuttgart, 1913, p. 32.

CHARLES B. PARKER, *Primary Examiner.*

N. MARMELSTEIN, H. J. LIDOFF, *Examiners.*

BERNARD HELFIN, E. A. LENARDSON, E. L. MORGAN, RICHARD L. RAYMOND,
*Assistant Examiners.*